United States Patent [19]

Taylor

[11] 3,816,947

[45] June 18, 1974

[54] LEVELING APPARATUS AND METHOD

[76] Inventor: Clifton I. Taylor, P.O. Drawer M, Maitland, Fla. 32771

[22] Filed: July 31, 1972

[21] Appl. No.: 276,700

[52] U.S. Cl................... 37/86, 37/195, 37/DIG. 19, 33/367
[51] Int. Cl.......... E02f 5/06, E02f 5/14, G01c 5/04
[58] Field of Search ............. 33/367, 377, 378, 333; 37/DIG. 19, 20, 86; 73/432 HA

[56] References Cited
UNITED STATES PATENTS

| | | | |
|---|---|---|---|
| 1,099,385 | 6/1914 | Linga | 37/DIG. 19 |
| 1,196,240 | 8/1916 | Husby | 33/367 |
| 1,369,235 | 2/1921 | Funk | 33/367 X |
| 1,566,174 | 12/1925 | Tyler | 33/367 |
| 2,405,634 | 8/1946 | Batterman | 33/333 |
| 2,789,365 | 4/1957 | Houge | 33/367 |

*Primary Examiner*—Louis R. Prince
*Assistant Examiner*—Charles E. Phillips
*Attorney, Agent, or Firm*—Duckworthy, Hobby & Allen

[57] ABSTRACT

A fluid leveling system for maintaining the level or grade of a trench being dug by a trenching machine, in which a pair of glass tubes are connected with a flexible hose and filled to a predetermined level with water or other liquid. One tube is attached to a fixed point while the other tube is attaching to the trenching machine and can be adjusted relative to the fixed point so that variations in the liquid level in either glass tube can be used to maintain the grade of the trench.

8 Claims, 5 Drawing Figures

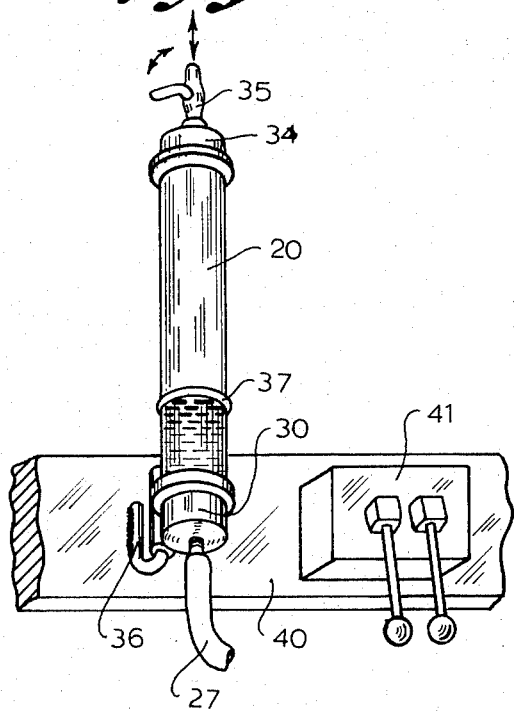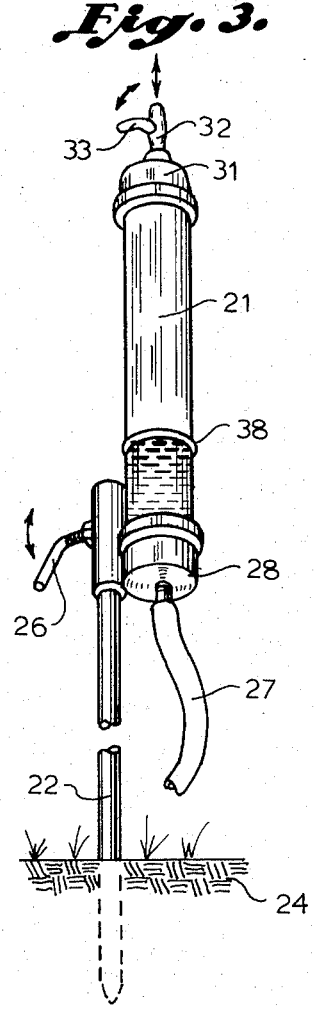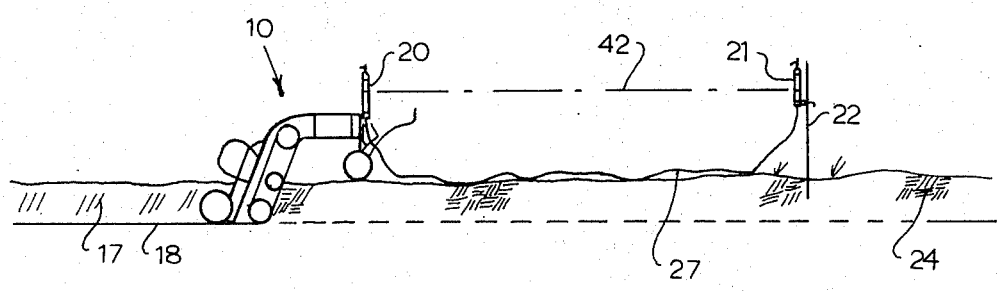

LEVELING APPARATUS AND METHOD

BACKGROUND OF THE INVENTION

The present invention relates to a water leveling system for leveling one point relative to a second fixed point and which may be utilized to control the grade of a trench, or the like.

In the past, leveling of subterranean trenches and controlling the grade of the trenches has been done in a great variety of ways. These include stretching a string out with a bubble level attached thereto to determine when the string is level between two stakes that the string is attached to. Leveling is also done by utilizing telescoping levels which include telescopes attached with telescope level and tripods for siteing on a target post. Transits are similarly used in a lot of site leveling work as are barametric leveling which is done by noting differences in barametric readings and trigonometric leveling which is done by computations of vertical angles. More recently it has been suggested to maintain levels utilizing a laser beam which projects a very narrow beam of light which can be utilized with a target for maintaining levels.

Water leveling systems have also been suggested and these include sight tubes being connected by a tube for measuring or maintaining a level between two points. This type of system may be seen in U.S. Pat. Nos. 2,789,365 for a leveling instrument; U.S. Pat. No. 2,587,998 for a hydrostatic measuring and leveling apparatus; U.S. Pat. No. 2,814,127 for a level indicating service; Pat. No. 3,015,167 for a liquid level; U.S. Pat. No. 2,150,048 for a level; U.S. Pat. No. 2,308,088 for a mercury level; and U.S. Pat. No. 2,438,758 for a liquid column level.

The present invention, on the other hand, relates to a simple leveling system for maintaining the level or grade of a trench when used in connection with a foundation trenching machine.

SUMMARY OF THE INVENTION

The present invention relates to a liquid leveling system for maintaining the level or variations from the level of a movable point relative to a fixed point and has a fixed level indicator or glass tube connected by flexible pipe to a movable level indicator located in spaced relationship to the fixed level indicator and movable relative to the fixed indicator. The tube and level indicators are filled with a liquid such as water until they reach a predetermined level so that each indicator tube will show the liquid. One level indicator is then attached to a fixed point such as a post driven in the earth with the level indicator adjusted thereon to a predetermined height and the movable level indicator can be moved as desired to level a second point relative to the fixed indicator by maintaining the water level in the glass tubes at the same height or with predetermined variations. Gradings and indicia can be placed on the indicator tubes and slidable bands can be used to mark the water level on each tube while valves are necessary to allow air to freely flow into and out of the indicator so as not to build up pressure and interfere with the readings on the glass indicator tubes. The movable indicator tube is located in a trenching machine and the depth of the trench set as desired. The trenching portion of the machine can then be maintained to maintain the grade of the trench.

BRIEF DESCRIPTION OF THE DRAWINGS

Other objects, features and advantages of this invention will be apparent from a study of the written description and the drawings in which:

FIG. 2 is a perspective view of one leveling indicator tube;

FIG. 3 is a perspective view of a second indicator tube attached to a fixed point;

FIG. 4 is a diagramatic view of the operation of the leveling system; and

DESCRIPTION OF THE PREFERRED EMBODIMENT

Figure 1:
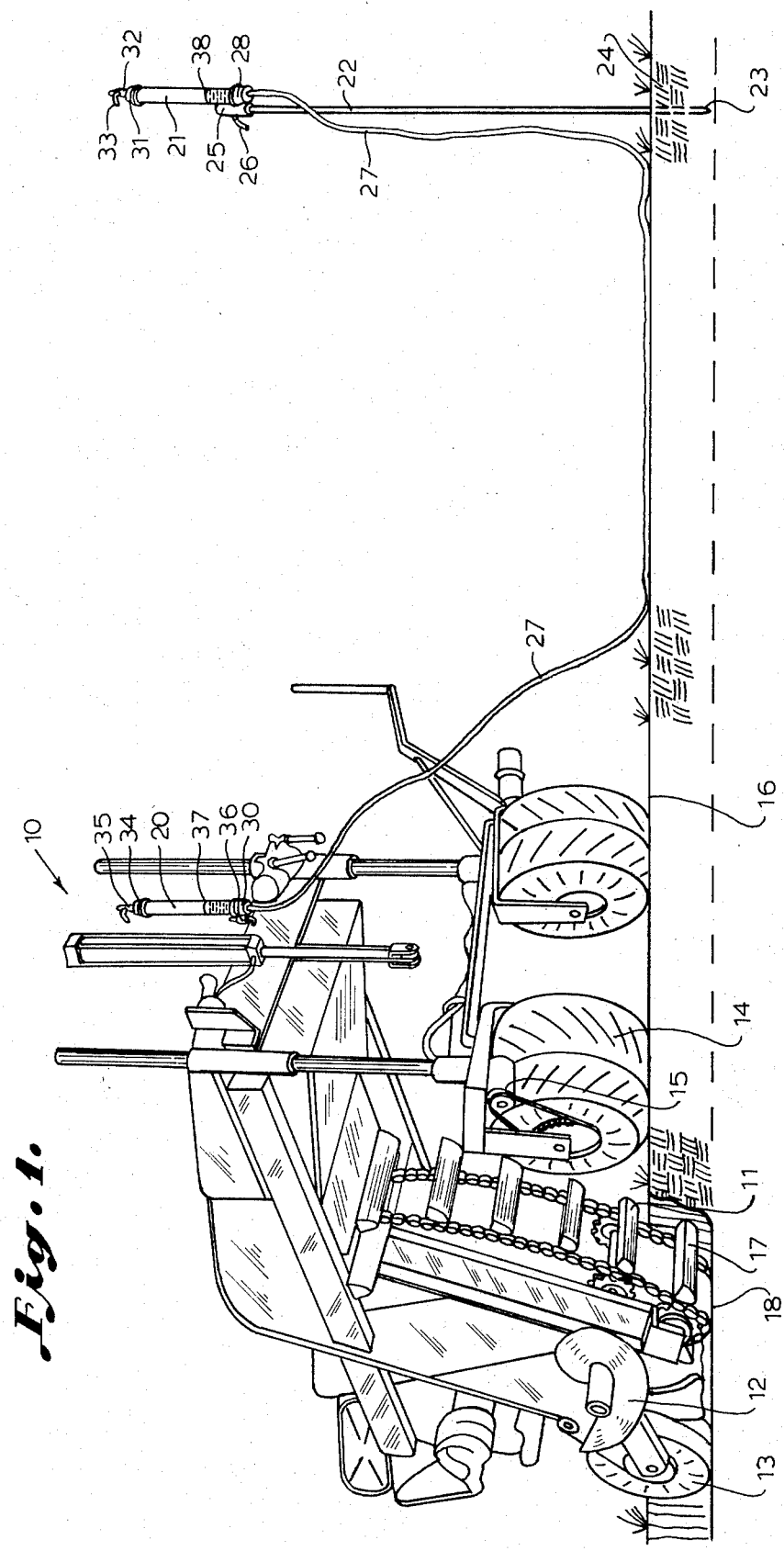
FIG. 1 is a perspective view of a trenching machine having the present leveling system attached thereto.

Referring now to FIG. 1, a foundation excavation or trenching machine 10 can be seen having an endless chain digging system 11 feeding into any or spreaders 12 and riding on an adjustable rear wheel 13 and pairs of front wheel assemblies 14 which are adjustable and which are driven by hydraulic motors 15 which moves the trencher along a ground elevation 16 while the endless chain digging system 11 digs a trench 17 having a bottom 18. The excavation system as illustrated can be more clearly seen in my U.S. Pat. No. 3,528,078 dated Sept. 8, 1970 for Trenching Machine. The present leveling system has a glass indicator tube 20 connected to the trenching machine 10 and a second glass indicating tube 21 attached to a steel bar 22, or the like, which is pointed at 23 and driven into the earth 24. A glass indicator tube 21 is attached to a sleeve 25 which has a handle 26 threaded thereto for locking the sleeve 25 to the bar 22 so that the indicator tube 21 can be moved up and down on the bar 22 and locked in place at a predetermined height. The glass indicator tube 21 has a hose 27 connected thereto by coupling 28, with the hose 27 also being connected to the glass indicator tube 20 by means of a coupling 30. The glass indicator tube 21 has a top portion 31 with a valve 32 having a valve handle 33 which may be opened and closed for applying liquid to the system and also for allowing the ingress and egress of air from the indicator tube 21 to prevent the buildup of air in the indicator tube during the operation of the system. Similarly, glass indicator tube 20 has a top portion 34 with a valve 35 for opening the inside of the indicator tube to the surrounding atmosphere. Indicator tube 20 also has a bottom portion 30 which has a connector 36 which attaches the indicator tube 20 to the trencher 10. The indicator tube 20 has a slidable band 37 while the indicator tube 21 has a slidable band 38 which can be moved to indicate liquid levels in the tubes 20 and 21.

It should of course be noted that printed gradings and indicia can also be placed on the tube to indicate variations in the liquids between the tubes. In operation the tubes are filled to predetermined levels and then the digging teeth of the digging system 11 are barely allowed to touch the ground, with the tire pressure adjusted to predetermined tire pressures and the indicator systems are set to be leveled. The bar 22 can then be driven in the ground at a remote point and the sleeve 25 adjusted on the bar 22 to bring the levels of the indicator tubes 21 and 20 to the same heights and when the digging system 11 reaches a predetermined depth in a trench 17, the point can be marked on the level indicator 20 and set to maintain the ground leveling of the bottom of the trench 18 and can also be utilized to vary slightly the grade of the trench for laying gravity fed pipes, or the like.

The operator of the trencher 10 stands in front of the trencher to operate the trencher both as to direction and level where he can clearly see the tube 20 and maintain the level as desired.

FIGS. 2 and 3 illustrate the movable indicator tube 20 and the fixed indicator tube 21 with the tube 20 attached to its bottom portion 30 and to a support 40 on the trencher 10 by brackets 36 and being connected to the tube 27 which is shown next to the set of hydraulic controls 41 for controlling the trencher. The indicator tube 20 has a top portion 34 with valve 35 thereon for opening and closing to the atmosphere. Indicator tube 21 as shown in FIG. 3 has the bottom portion 28 connected to a sleeve 25 having a threaded handle 26 therethrough for locking the sleeve 25 to a bar 22 which can be driven into the ground 24. The bottom portion 28 of the tube 21 also has a tube 27 connected thereto at its other end, and has a top portion 31 and a valve 32 operated by a handle 33 for opening and closing access to the tube 21.

FIG. 4 shows a diagramatic view of the system in operation in connection with the trencher digging a trench 17 having a bottom 18 into the earth 24 and having a hole 22 driven into the earth 24 with the indicator tube 21 attached thereto and indicator tube 20 attached to the hose 27 and to the trencher 10 and in which the water levels are indicated by a dash line 42 for both indicator tubes 20 and 21 which level, once set, can be maintained to maintain the bottom of the trench 18 level at all points relative to the line 42 which maintains a level trench no matter which way the trench is directed by the operator, and in the case of foundations would allow sharp turns with the trencher 10, since the leveling system has a flexible tube 22 which will not interfere with the operation of the trencher.

Figure 5:
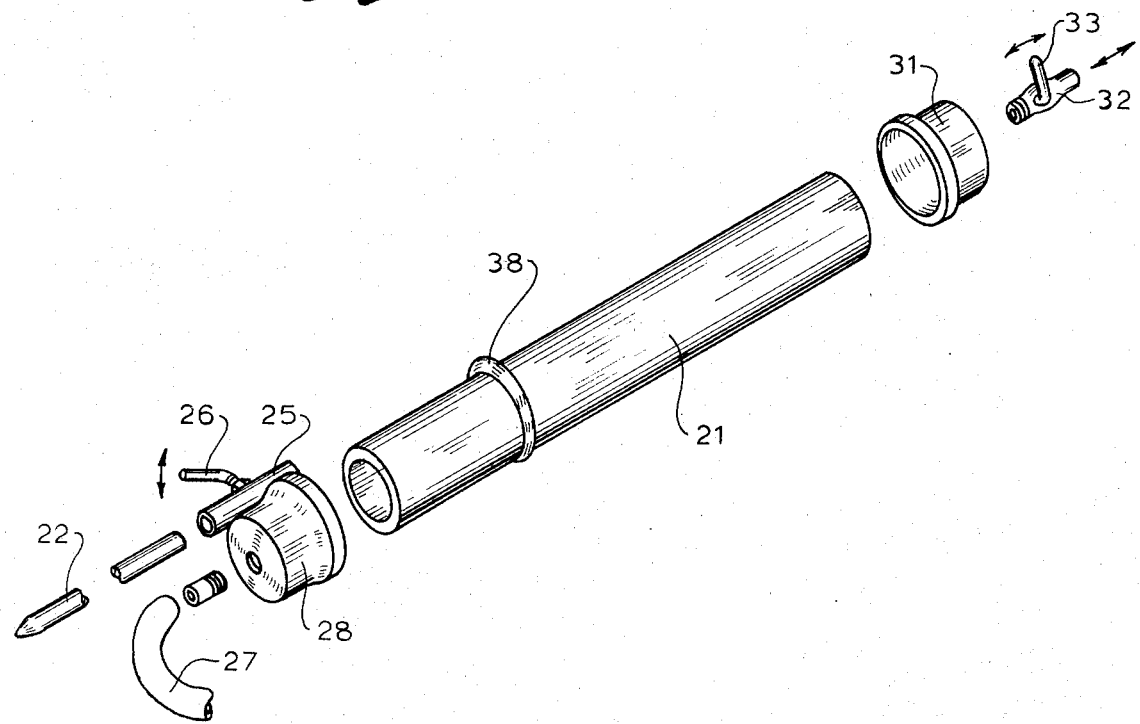
FIG. 5 is an exploded view of one of the indicator tubes.

Referring now to FIG. 5, an exploded view of the indicator tube 21 is shown having a slidable band or sleeve 38 attached thereto which tube 21 can be of lucent material such as glass or a clear polymer of any type desired so long as the level of liquid can be viewed therethrough. It could accordingly also be a metal tube with a glass viewing slot, without departing from the spirit and scope of the invention. The viewing or indicator tube 21 has the top portion 31 along with the separate valve 32 having the handle 33 and a bottom portion 28 connected to the tube 27 and having a sleeve 25 fixedly attached thereto with a threaded handle 26 threaded through the sleeve 25 for locking the sleeve 25 to a rod 22.

The present invention allows a trenching machine to maintain a foundation trench level during the digging of the trench even during turns and gets away from bubble levels placed on the machine which during a series of adjustments over a long trench can accumulate the errors from each releveling. This is avoided by the present system by the corrections always being made relative to the same fixed point.

It should accordingly be realized at this point that this invention is not to be construed as limited to the particular forms disclosed herein since these are to be regarded as illustrative rather than restrictive.

I claim:

1. A trenching machine for excavating in the earth having a liquid leveling means comprising in combination:
   a. a wheeled vehicle movable over a surface;
   b. excavation means for subterranean excavation movably connected to said wheeled vehicle, said excavation means being movable relative to said wheeled vehicle for adjusting the depth of the excavation relative to said wheeled vehicle;
   c. first liquid level indicating tube having means for adjustably attaching said tube in a predetermined position relative to the earth surface; said means for attaching said tube including a pole for driving in the earth's surface;
   d. second liquid level indicating tube fixedly located on said excavation means and being movable therewith and relative to said first liquid level indicating tube;
   e. a flexible tube connecting said first and second liquid level indicating tubes;
   f. said first and second indicating tubes and said flexible tube being at least partially filled with liquid so that raising or lowering said second liquid level indicating tube with said excavation means and relative to said first liquid level indicating tube will vary the level of liquid in said second liquid level indicating tube relative to the first liquid level indicating tube;
   g. means on said second liquid level indicating tube to indicate a predetermined level in said tube; and
   h. vent means for venting said first and second liquid level indicating tubes whereby said second liquid level indicating tube may be maintained with a predetermined liquid level therein relative to said first liquid level indicating tube whereby said second level indicating tube located on said excavation means constantly maintains the level of excavation depth relative to the level of liquid in said second liquid level indicating tube.

2. The apparatus in accordance with claim 1 in which said second liquid level indicating tube has a slidable band thereon for marking the level of liquid therein.

3. The apparatus in accordance with claim 2 in which said vent means includes a valve located on said first liquid level indicating tube and on said second liquid level indicating tubes to the atmosphere and for sealing said first and second liquid level indicating tubes from the atmosphere in said valves closed positions.

4. The apparatus in accordance with claim 3 in which said first liquid level indicating tube has a sleeve slidable on said pole driven in the earth and means for locking said sleeve at any predetermined point on said pole.

5. The apparatus in accordance with claim 4 in which said excavation machine is a machine for digging trenches.

6. A method of maintaining the level of an excavation being dug by a movable excavating machine comprising the steps of:
   a. attaching a liquid level indicating tube in a fixed position to a support in the earth;
   b. fixing a second liquid level indicating tube on an excavation machine digging portion and relative to said first liquid level indicating tube, said first and second liquid level indicating tubes being connected by a flexible hose therebetween, and said hose and said first and second liquid level indicating tubes being at least partially filled with liquid;

c. locating the level of one liquid level indicating tube relative to the second liquid level indicating tube by the movement of at least one said tube relative to the other; and
d. maintaining the level of said second liquid level indicating tube relative to said first liquid level indicating tube during the digging of an excavation by shifting vertically said excavation machine digging portion to maintain a level excavation floor.

7. A method in accordance with claim 6 including sliding said first liquid level indicating tube on said pole in the earth for adjustment thereof and locking said first liquid level indicating tube at a predetermined position on said pole.

8. The method in accordance with claim 7 including the steps of adjusting the tire pressure in the tires prior to starting an excavation, adjusting the digging teeth of the excavation machine to barely touch the earth, then setting the levels of the liquid level indicator tubes and starting the excavation.

* * * * *